United States Patent
Ogura et al.

(10) Patent No.: US 11,874,547 B2
(45) Date of Patent: Jan. 16, 2024

(54) FILM WRAPPING DISPLAY

(71) Applicant: Panasonic Intellectual Property Management Co., Ltd., Osaka (JP)

(72) Inventors: Motonari Ogura, Osaka (JP); Kaname Tomita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/363,530

(22) Filed: Jun. 30, 2021

(65) Prior Publication Data

US 2023/0004041 A1 Jan. 5, 2023

(51) Int. Cl.
*G02F 1/1333* (2006.01)
*G02F 1/13357* (2006.01)
*G02F 1/1335* (2006.01)

(52) U.S. Cl.
CPC .... *G02F 1/133331* (2021.01); *G02F 1/13338* (2013.01); *G02F 1/133507* (2021.01); *G02F 1/133611* (2013.01)

(58) Field of Classification Search
None
See application file for complete search history.

(56) References Cited

U.S. PATENT DOCUMENTS

| | | | |
|---|---|---|---|
| 2006/0209502 A1* | 9/2006 | Sakata | G06F 1/1601 361/679.54 |
| 2012/0113369 A1 | 5/2012 | Kim et al. | |
| 2013/0242483 A1* | 9/2013 | Hirasawa | G02F 1/155 361/679.01 |
| 2014/0127442 A1 | 5/2014 | Ryu et al. | |
| 2014/0178647 A1* | 6/2014 | Kim | B44F 7/00 428/166 |
| 2014/0204308 A1* | 7/2014 | Chung | G02B 6/0088 349/58 |
| 2014/0267980 A1* | 9/2014 | Kang | G02F 1/1336 349/62 |

(Continued)

FOREIGN PATENT DOCUMENTS

| | | |
|---|---|---|
| EP | 3 757 670 | 12/2020 |
| JP | 2007-179520 | 7/2007 |
| JP | 2011-008448 | 1/2011 |

(Continued)

OTHER PUBLICATIONS

Extended European Search Report dated Jan. 4, 2022 in corresponding European Patent Application No. 20182770.4.

*Primary Examiner* — Phu Vu
(74) *Attorney, Agent, or Firm* — WENDEROTH, LIND & PONACK, L.L.P.

(57) ABSTRACT

A film wrapping display includes a display device configured to display information in a display area by emitting light, a transparent plate disposed on a display surface side of the display device, a bezel disposed around a periphery of the display device and including a support portion that supports the transparent plate, and a film continuously attached to both of the transparent plate and the bezel. A periphery of the display area where the transparent plate is supported by the support portion is an edge portion. The edge portion includes a decorative layer whose pattern or color is different from that of the display area.

7 Claims, 14 Drawing Sheets

(56) References Cited

U.S. PATENT DOCUMENTS

2018/0275454 A1    9/2018  Yasumoto
2020/0298615 A1*   9/2020  Gao ..................... B32B 17/10

FOREIGN PATENT DOCUMENTS

| | | |
|---|---|---|
| JP | 2011-194799 | 10/2011 |
| JP | 2014-092788 | 5/2014 |
| WO | 2014/129415 | 8/2014 |

* cited by examiner

FILM WRAPPING DISPLAY

TECHNICAL FIELD

The present disclosure relates to a film wrapping display.

BACKGROUND ART

Known is a window member of a portable terminal including a glass member, a translucent printing layer formed on the glass member, and a metal layer formed on the translucent printing layer (for example, refer to JP-A-2014-92788). The translucent printing layer includes unevenness on a surface in contact with the metal layer, and is formed by mixing transparent paint and toning paint and by printing and curing the mixed paint on one surface of the glass member.

SUMMARY

The present disclosure provides a film wrapping display capable of further improving an aesthetic appearance of an edge portion and eliminating unnaturalness in appearance.

There is provided a film wrapping display includes a display device configured to display information in a display area by emitting light, a transparent plate disposed on a display surface side of the display device, a bezel disposed around a periphery of the display device and including a support portion that supports the transparent plate, and a film continuously attached to both of the transparent plate and the bezel, in which a periphery of the display area where the transparent plate is supported by the support portion is an edge portion, and the edge portion includes a decorative layer whose pattern or color is different from that of the display area.

According to the present disclosure, it is possible to further improve an aesthetic appearance of an edge portion and eliminate unnaturalness in appearance.

DESCRIPTION OF EMBODIMENTS

Hereinafter, embodiments in which a film wrapping display according to the present disclosure is specifically disclosed will be described in detail with reference to the appropriate drawings. However, a detailed description more than necessary may be omitted. For example, a detailed description of an already well-known matter and a duplicate description for substantially the same configuration may be omitted to avoid unnecessary redundancy of the following description and to facilitate the understanding of those skilled in the art. The accompanying drawings and the following descriptions are provided for those skilled in the art to fully understand the present disclosure, and are not intended to limit the subject matter described in the scope of the claims.

For example, when a touch panel is covered with an anti-glare (AG) film (or a protective film), and when the heated AG film is attached to a display and cooled, a shear load is applied to an adhesive layer between the film and the display due to a difference in heat shrinkage, such that glue may be stretched, and unnaturalness in appearance may occur at an edge portion of the display.

Hereinafter, an example of a film wrapping display that can improve an aesthetic appearance of the edge portion and eliminate the unnaturalness in appearance will be described.

Figure 1:
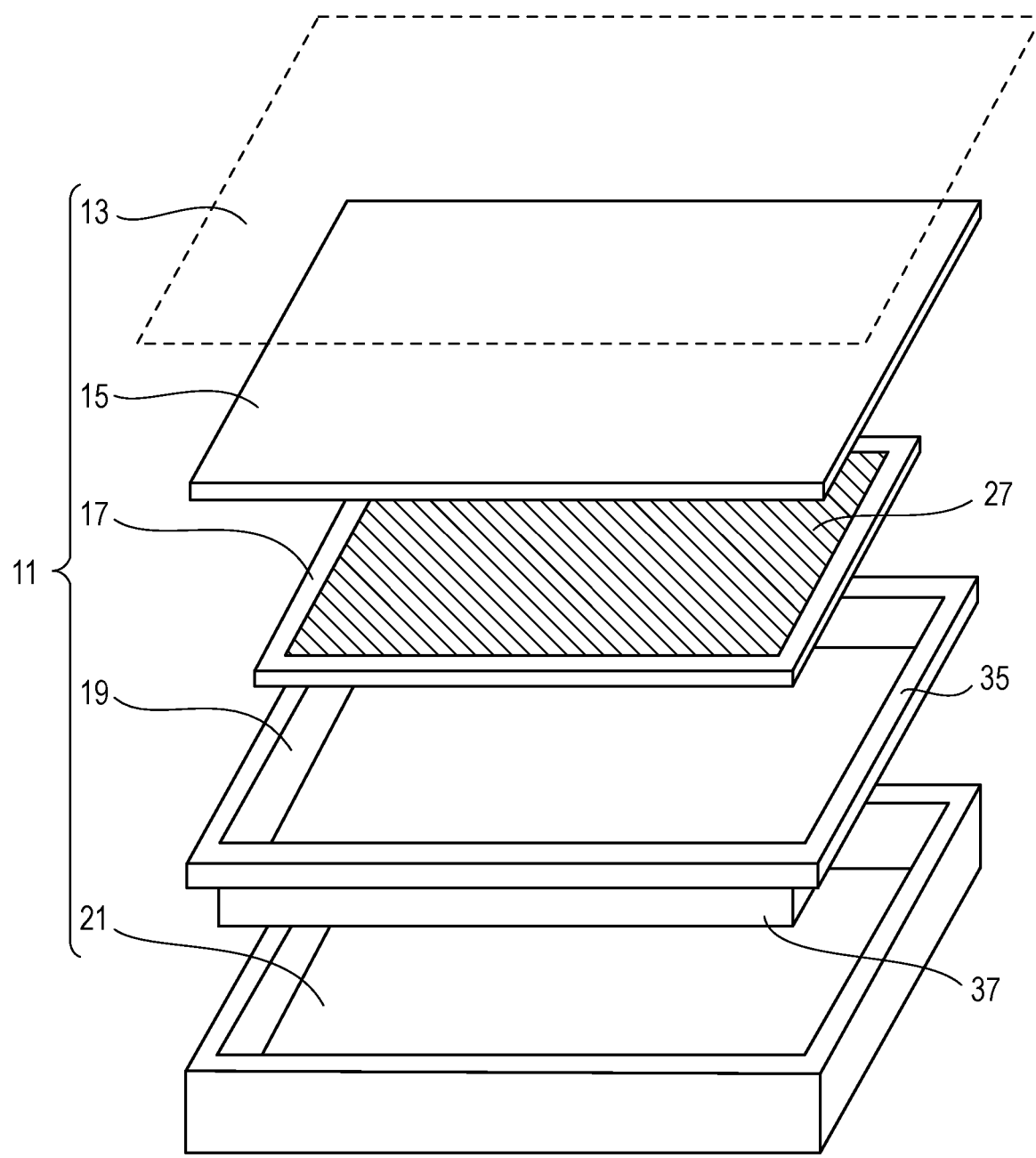
FIG. 1 is an exploded perspective view illustrating a configuration example of a film wrapping display provided with a transparent plate to which a film according to a first embodiment is attached.

FIG. 1 is an exploded perspective view illustrating a configuration example of a film wrapping display provided with a transparent plate to which a film according to a first embodiment is attached. A film wrapping display 11 includes a film 13, a touch panel 15 which is a transparent plate, a display device 17, a bezel 19, and a housing 21. The film wrapping display 11 is an assembly thereof.

Figure 2:
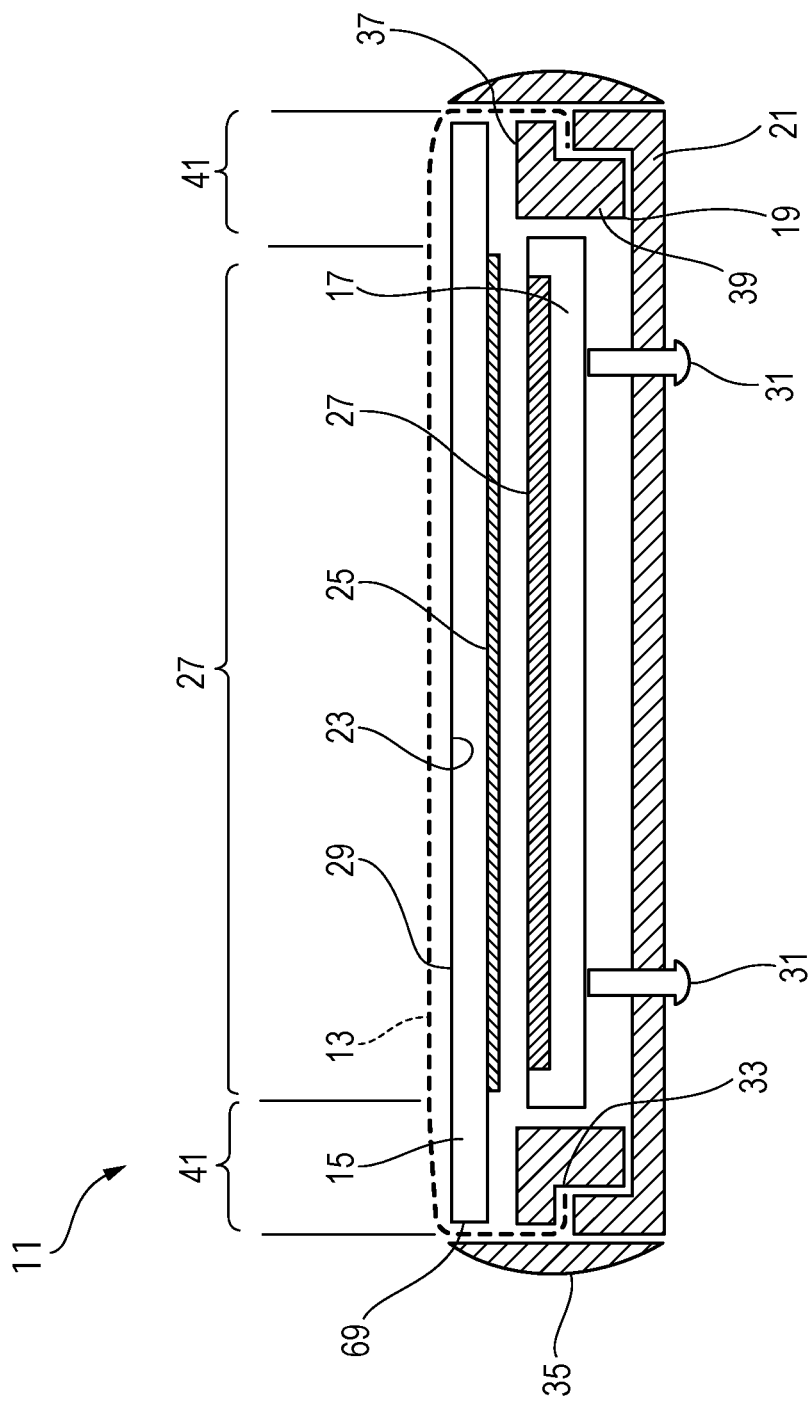
FIG. 2 is a cross-sectional view of a film wrapping display in an assembled state cut in a direction perpendicular to a touch panel.

FIG. 2 is a cross-sectional view of the film wrapping display 11 in an assembled state cut in a direction perpendicular to the touch panel 15. The touch panel 15 is disposed on a display surface side of the display device 17. The touch panel 15 includes a cover glass 23 and a sensor glass 25. The sensor glass 25 is a glass having a function of a sensor for detecting a touch operation performed by a user. An example of the touch panel 15 includes a glass panel provided with, for example, an electrostatic capacitance type sensor that detects, by coating a thin conductive substance on a surface of a glass and allowing a small amount of current to flow, a change in the current when the surface of the glass is touched and that identifies a touched position from an amount of the change. The cover glass 23 is a glass plate installed to protect the sensor glass 25 to improve durability of the touch panel 15 or to improve designability of an appearance. When the sensor glass 25 has sufficient durability, the cover glass 23 may not be used.

The display device 17 is a device that displays data (information) of an image or a video by emitting (radiating) light from a display area 27 installed in a direction in which the touch panel 15 is provided. Examples of the display device 17 include a liquid crystal panel, an organic EL panel, or a 7-segment LED, or the like. In addition to the liquid crystal panel, the display device 17 includes a substrate on which a circuit for controlling the touch panel 15 and the display device 17 is mounted, a wiring for connecting each module, or the like as components of the film wrapping display 11. Since the descriptions thereof becomes complicated, the descriptions of the configurations such as the substrate, the wiring for connecting each module, or the like described above will be omitted.

In the touch panel 15, a surface on a side where the display area 27 exists becomes a touch surface 29. A protective glass having the touch surface 29 is disposed on at least one surface of the touch panel 15. In the first embodiment, the protective glass is the cover glass 23.

The display device 17 and the touch panel 15 may adhere to each other by filling a gap therebetween with resin.

In the present example, the display device 17 is fixed to the housing 21 by using, for example, a screw 31. A height of a side surface of the housing 21 is lower than that of an edge 33 of the film 13. A cover 35 is installed on an outside of the housing 21. The cover 35 is mounted on the housing 21 by screwing, fitting, gluing, or the like, and is disposed so that the edge 33 of the film 13 becomes invisible when the user looks at the appearance of the film wrapping display 11. As a result, it is possible not only to prevent a boundary between a place where the film 13 is attached and a place where the film 13 is not attached from being visible so that the aesthetic appearance thereof is not spoiled, but also to prevent the film 13 from being peeled off from the edge 33. Here, a height of an upper end of the cover 35 and a height of the touch surface 29 of the touch panel 15 are made almost the same as each other, and a flat appearance (flattening a front surface) in which an outer frame or the like are not viewed from a user is made, thereby improving the designability.

The film wrapping display 11 includes a bezel 19 having a support portion 37. The bezel 19 is disposed around a periphery of the display device 17 and includes the support portion 37 that supports the touch panel 15 which is a transparent plate. The bezel 19 includes a square box-shaped bezel main body portion 39 having an opening on a side opposite to the touch panel 15, and the support portion 37 is formed to protrude outward from the opening of the bezel main body portion 39. The bezel 19 is located inside the housing 21, and fixes the touch panel 15 by supporting the touch panel 15 from an opposite surface of the touch surface 29 with the support portion 37. In the film wrapping display 11, a periphery of the display area 27 in which the touch panel 15 is supported by the support portion 37 forms an edge portion 41. The bezel 19 may be a portion molded to be integrated with the housing 21. The bezel 19 is a separate component from the housing 21 and may be configured to be fixed to the housing 21 by screwing or fitting. In the first embodiment, the housing 21 is defined as a component, and the housing 21 is not an essential component. When the film wrapping display 11 is installed by directly attaching the bezel 19 to a wall surface, the housing 21 may not be required.

In the first embodiment, the film 13 is attached to cover the touch surface 29 of the touch panel 15. The film 13 is attached to the touch surface 29 of the touch panel 15 and is also continuously attached to an end surface of the cover glass 23, and further is also attached to the support portion 37 of the bezel 19. That is, the film 13 is continuously attached to the touch panel 15 and the bezel 19. The edge 33 of the film 13 is located to cover an outermost periphery of the touch panel 15, to sandwich the touch panel 15, and to wrap around up to a space opposite to a side where the user viewing information is present.

In the first embodiment illustrated in FIG. 2, the edge 33 of the film 13 is located to be closer to the inside than the end surface of the cover glass 23. However, it is not necessarily required to attach the film 13 to that extent. When the film 13 is applied to a part of the support portion 37, a certain effect is obtained.

As such, in the film wrapping display 11, the film 13 is attached to the touch surface 29 of the touch panel 15, and is also continuously attached to the end surface of the cover glass 23. In the film wrapping display 11, the film 13 is further continuously attached to the support portion 37, such that glass pieces can be prevented from scattering in a direction approximately parallel to the touch surface 29 even when the cover glass 23 is broken by an impact applied to the touch panel 15.

When the film 13 is attached so that the edge 33 of the film 13 is located to be closer to the inside than the end surface of the cover glass 23 as shown in the first embodiment, and when the touch panel 15 is deformed by the impact applied to touch panel 15, the edge 33 of the film 13 can be prevented from being peeled off from the support portion 37. The reason is that resistance when the film 13 is pulled toward the side where the user is present in a direction perpendicular to the touch panel 15 is increased (that is, an anchor effect is generated).

Figure 3:
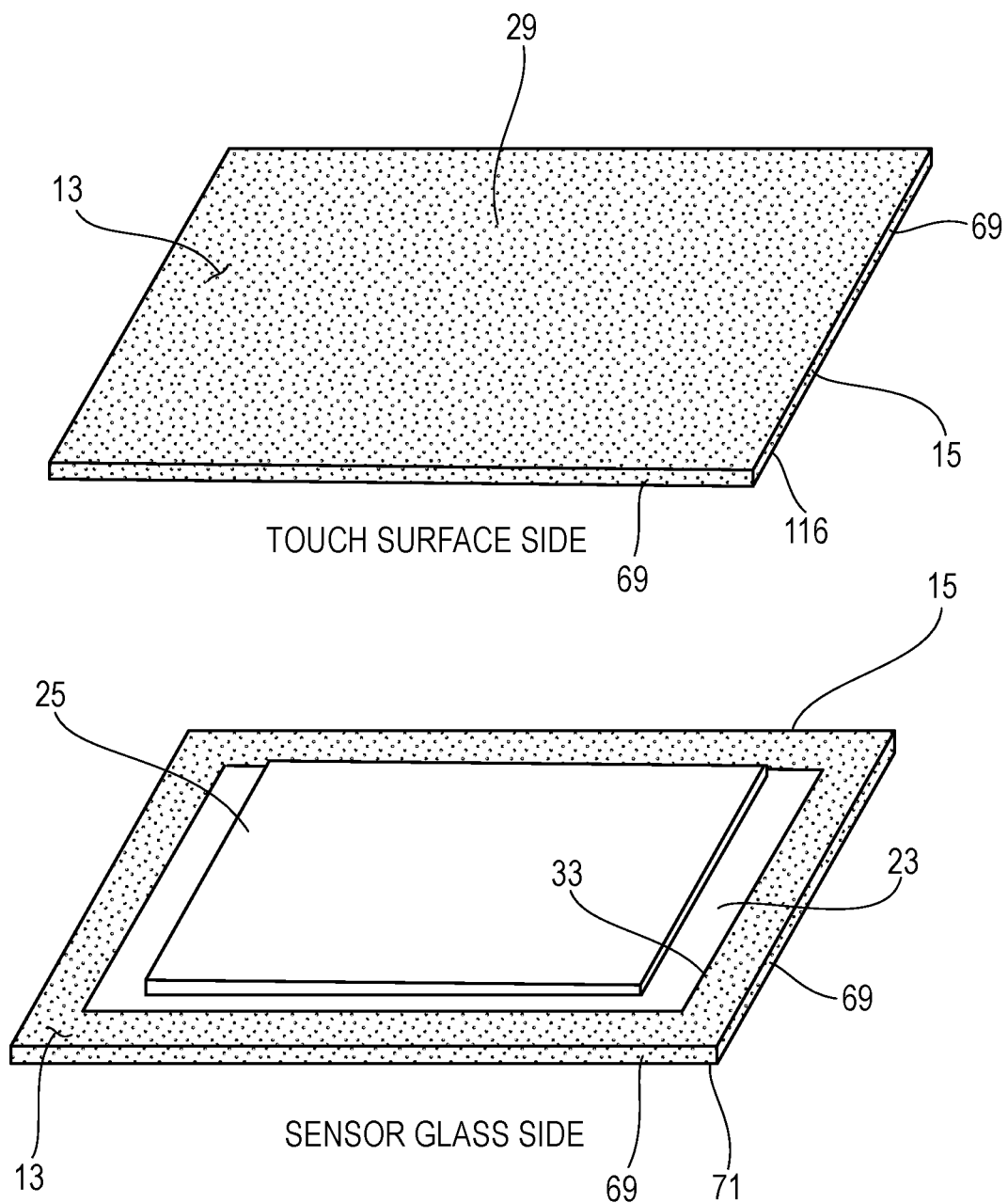
FIG. 3 is an exploded perspective view illustrating an overall image of the touch panel wrapped with the film.

FIG. 3 is an exploded perspective view illustrating an overall image of the touch panel 15 wrapped with the film 13. The film 13 is attached to the touch panel 15 to cover an area of the touch panel 15 indicated by dots in FIG. 3. In the first embodiment, the edge 33 of the film 13 is attached to the support portion 37 by wrapping around up to the support portion 37 on the side opposite to the side where the user viewing the information is present, and it is freely determined how far the edge 33 of the film reaches.

As such, the film 13 is attached to the touch surface 29 of the touch panel 15 and is also continuously attached to the end surface of the cover glass 23, and the edge 33 of the film 13 reaches the surface opposite to the touch surface 29 of the touch panel 15, thereby making it possible to prevent the glass pieces from scattering in the direction approximately parallel to the touch surface 29 even when the cover glass 23 is broken by the impact applied to the touch panel 15.

Figure 4:
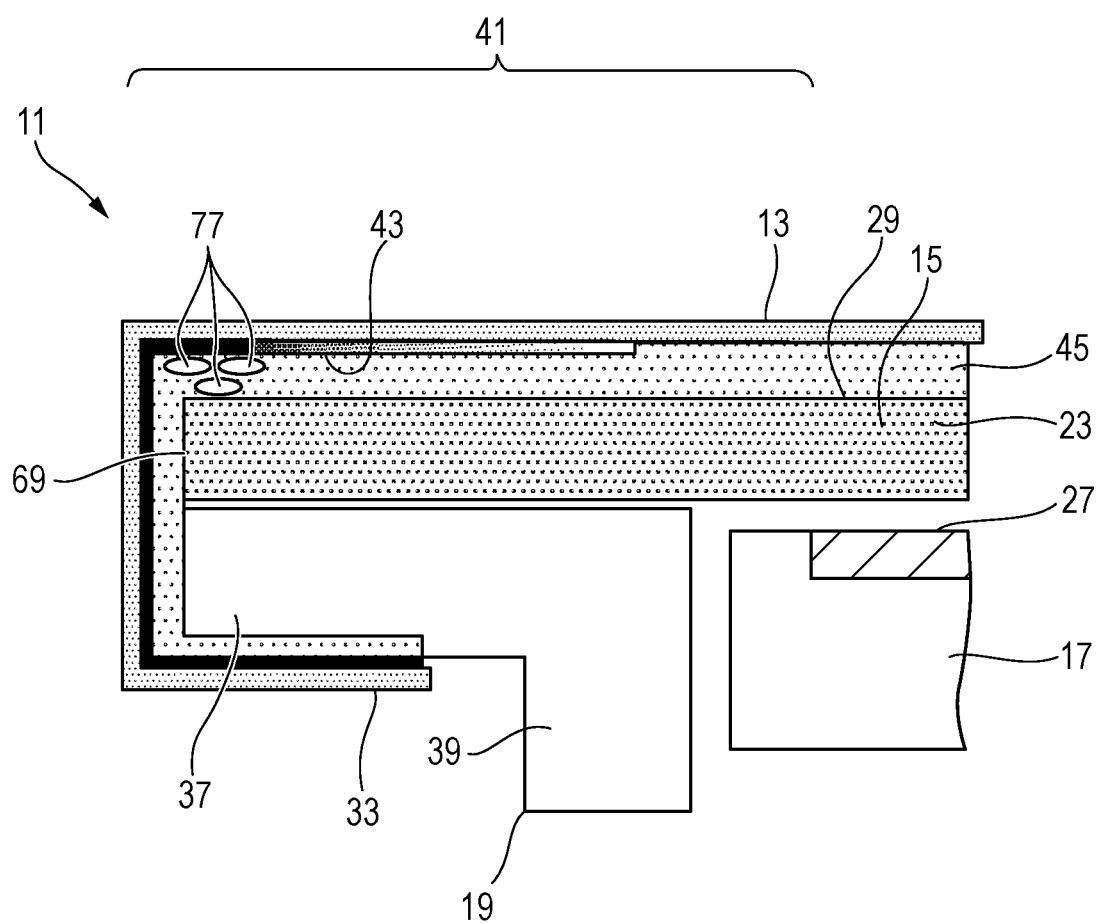
FIG. 4 is an enlarged cross-sectional view of a main part at an edge portion of the film wrapping display.

FIG. 4 is an enlarged cross-sectional view of a main part of the edge portion 41 of the film wrapping display. In the film wrapping display 11 according to the first embodiment, the edge portion 41 includes a decorative layer 43 whose pattern or color is different from that of the display area 27. Here, the pattern is a "shape" applied to decoration of the film 13 and the touch panel 15. The color is a "color".

Description of "different from that of the display area 27" does not indicate that the display area 27 necessarily includes the pattern or the color. Of course, it is possible that the display area 27 has the pattern or the color in a range that does not cause deterioration in visibility, but in most cases, the display area 27 is colorless and transparent with no pattern.

In the first embodiment, the decorative layer 43 is added to an inside of the film 13. The film 13 includes a thermoplastic adhesive layer 45 provided on a surface to be attached to the touch panel 15. The decorative layer 43 does not necessarily have the same pattern or color on a side where the user viewing the information is present with the adhesive layer 45 sandwiched therebetween and a touch panel side which is an opposite side thereof. The reason is that a required function of the decorative layer 43 on the side where the user is present with the adhesive layer 45 sandwiched therebetween may change due to an opposite side thereof.

For example, when the decorative layer 43 at the edge portion 41 is provided on the side where the user is present with the adhesive layer 45 sandwiched therebetween (for example, the decorative layer 43 is provided between the film 13 and the adhesive layer 45), brightness of the decorative layer 43 thereat is lower (closer to black) than that of the display area 27, and when the decorative layer 43 thereat is provided on the side opposite to the side where the user is present with the adhesive layer 45 sandwiched therebetween (for example, a back surface of the touch panel 15), the brightness thereof is high (the color gets closer to white).

The color of the decorative layer 43 has higher brightness, lower saturation, higher reflectance, or lower transparency than those of the display area 27. Here, as an example, the decorative layer 43 can be provided at a location on the side opposite to the side where the user is present with the adhesive layer 45 sandwiched therebetween (for example, the back surface of the touch panel 15). The brightness is an intensity of brightness (light). The saturation is a degree at which there is no whiteness (vividness). The reflectance is a ratio of an intensity of a reflected wave to an intensity of an incident wave. The transparency is a value representing transparency.

The brightness, the saturation, the reflectance, or the transparency of the decorative layer 43 may gradually change as a distance between the decorative layer 43 and the display area 27 increases. For example, in the case of the brightness, when the decorative layer 43 is provided on the side where the user is present with the adhesive layer 45 sandwiched therebetween (for example, provided between the film 13 and the adhesive layer 45), the brightness thereof gradually decreases (the color gets closer to black) as the distance between the decorative layer 43 and the display area 27 increases (refer to FIG. 4). On the other hand, when the decorative layer 43 is provided on the side opposite to the side where the user is present with the adhesive layer 45 sandwiched therebetween (for example, the back surface of the touch panel 15), the brightness thereof gradually increases (the color gets closer to white) as the distance between the decorative layer 43 and the display area 27 increases (refer to FIG. 11).

In the film wrapping display 11 according to the first embodiment illustrated in FIG. 4, the decorative layer 43 is provided on the side where the user is present with the adhesive layer 45 sandwiched therebetween (for example, provided between the film 13 and the adhesive layer 45) by printing or the like. The decorative layer 43 changes so that the brightness thereof gradually decreases (the closer gets closer to black) as the distance between the decorative layer 43 and the display area 27 increases. In the decorative layer 43, the color thereof gets closer to black toward an end of the edge portion 41, such that the back surface of the film 13, that is, the adhesive layer 45 is difficult to be seen from the side where the user viewing the information is present.

Figure 5:
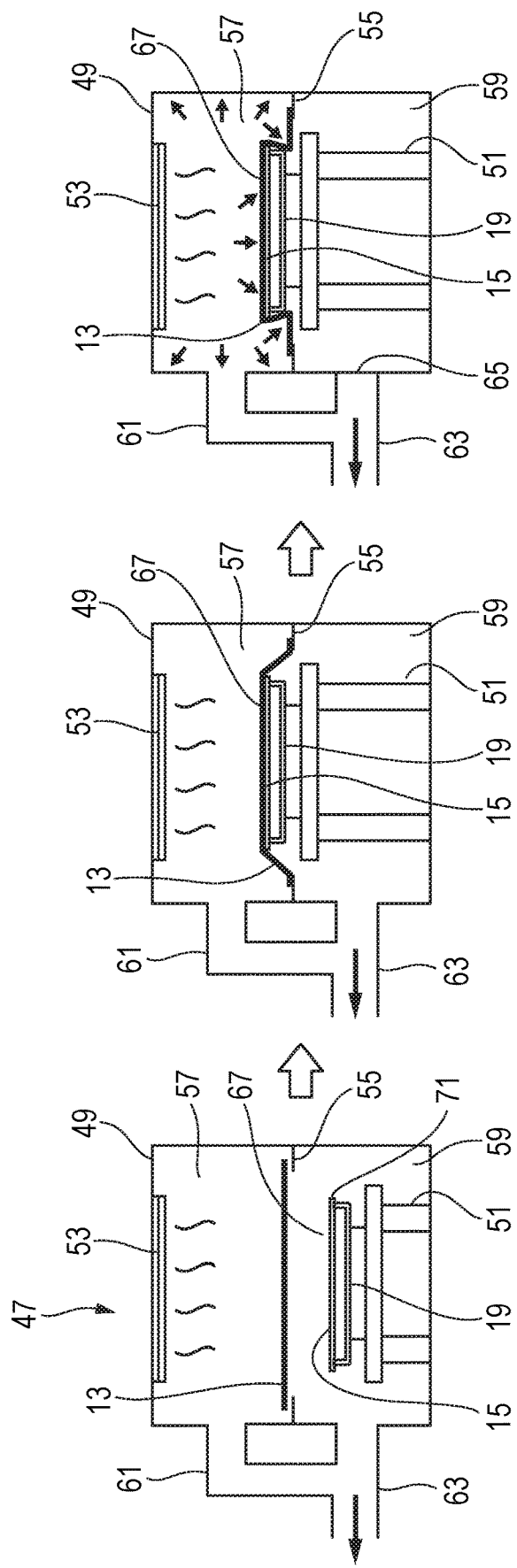
FIG. 5 is a process diagram illustrating a film attaching procedure by TOM molding.

Next, TOM molding, which is an example of a method of attaching the film 13, will be described. FIG. 5 is a process diagram illustrating a procedure of attaching the film 13 by the TOM molding.

A film wrapping process by the TOM molding is performed by a wrapping device 47. The wrapping device 47 includes a chamber 49 having an airtight structure, an elevation table 51 provided in the chamber, and a heater 53.

The chamber 49 is provided with a frame-shaped film fixing portion 55 at a boundary that divides an internal space of the chamber 49 into an upper space and a lower space. The film fixing portion 55 fixes a whole periphery of the film 13. An internal space of the chamber 49 is divided into an upper space 57 and a lower space 59 by the film 13 fixed to the film fixing portion 55.

An upper air supply and exhaust pipe 61 is connected to the upper space 57 of the chamber 49, and a lower air supply and exhaust pipe 63 is connected to the lower space 59. The upper air supply and exhaust pipe 61 and the lower air supply and exhaust pipe 63 are integrated and connected to a vacuum pump which is not illustrated or can be opened to the atmosphere. The lower air supply and exhaust pipe 63 and the lower space 59 can be freely opened and closed by a closing valve 65.

The film 13 is fixed to the film fixing portion 55 in order to perform film wrapping by using the wrapping device 47. A workpiece 67 is placed on the elevation table 51 and fixed thereto. Here, the workpiece 67 is assembled with, for example, the bezel 19 and the touch panel 15 illustrated in FIG. 2. The workpiece 67 is not limited thereto.

The vacuum pump is driven to reduce pressure in the upper space 57 and the lower space 59. Here, the film 13 and the adhesive layer 45 are simultaneously heated and softened by using the heater 53.

After the film 13 is softened to a predetermined hardness, the elevation table 51 is raised. The elevation table 51 is raised until the touch panel 15 of the placed workpiece 67 pushes up the film 13 up to a predetermined height. The height is set to at least a height in which a back surface of the bezel 19 is located above the film fixing portion 55.

The closing valve 65 is closed while the heater 53 generates heat, and the lower space 59 is sealed in an almost vacuum state. An operation of the vacuum pump is stopped, and the upper air supply and exhaust pipe 61 and the lower air supply and exhaust pipe 63 are opened to the atmosphere. Here, while the upper space 57 is returned to an atmospheric pressure, the lower space 59 where the closing valve 65 is closed remains in the almost vacuum state. The film 13, which partitions the upper space 57 and the lower space 59 and is in a softened state, is drawn to a lower space side due to a difference in an air pressure and is deformed. As a result, the film 13 adheres to an outer peripheral surface of the workpiece 67 to wrap around the workpiece 67 from the touch panel 15.

According to the wrapping of the film wrapping display 11 by the TOM molding, the edge 33 of the film 13 is also wrapped around a side surface of the bezel 19 and a back surface of the support portion 37 opposite to the touch panel 15 (refer to FIG. 4), such that the film 13 can be more reliably attached to the work 67.

As described above, as illustrated in FIG. 3, in the touch panel 15 whose touch surface 29 is covered with the film 13, a corner portion 71 at which adjacent end surfaces 69 intersect each other is covered with the continuous film 13. In FIG. 3, the support portion 37 of the bezel 19 is omitted. As illustrated in FIG. 4, in the bezel 19, in addition to a side surface of the support portion 37, an edge of the back surface is further covered by the edge 33 of the continuous film 13.

As described above, the attaching method such as the TOM molding or the like can satisfactorily cover the corner portion 71 at which the adjacent end surfaces 69 intersect each other in the touch panel 15 with the continuous film 13. For example, the touch panel 15, which is formed in a shape of a quadrangular plate, has four corners provided on the touch surface 29 which is one surface. Four corners are also provided on the other surface which is a surface opposite to the one surface. Side surfaces of the touch panel 15 in a plate thickness direction, which are sandwiched between the touch surface 29 and the other surface, become four end surfaces 69. The adjacent end surfaces 69 of the four end surfaces 69 respectively intersect each other at the corner portion 71. The corner portion 71 forms a linear edge connected to a corner of the touch surface 29 and a corner of the other surface. That is, the corner portion 71 forms a sharp corner. Both ends of the corner portion 71 are connected to sharp corners that become triangular-pyramid-shaped apex angles on front and back surfaces of the touch panel.

Strictly speaking, the corner portion 71 may not be linear. That is, the corner portion 71 may be chamfered by cutting a sharp corner away. Then, microscopically, the corner portion 71 becomes a surface.

In the attaching method such as the TOM molding or the like, in the plate-shaped touch panel 15, one continuous film 13 can be covered to adhere to the adjacent two end surfaces 69 without any gap from the one surface, to simultaneously adhere to the sharp corners having the triangular pyramid shape, and thus to wrap around the touch panel 15. The one continuous film 13 has a shape cut in from an outer shape to an inner side or has a shape without a concave portion. According to the adhering method such as the TOM molding or the like, the cross-shaped film 13 having a development view of the surface of the touch panel 15 and the four side surfaces of the touch panel 15 is generated, and when respective side portions of the cross-shaped film are bent parallel to the four side surfaces of the touch panel 15 to cover the four side surfaces thereof, an overlapped portion is not formed along the corner portion 71. That is, the corner and the corner portion 71 can be continuously wrapped around without providing a gap.

In the touch panel 15 on which the film 13 is covered by the attaching method such as the TOM molding or the like, the overlapped portion is not formed at the corner portion 71, such that broken pieces and powder are difficult to jump out during breakage of glass. Since the corner portion 71, which is most likely to become a sharp edge during the breakage of the glass, can be continuously covered by the continuous film 13, the sharp edge is difficult to be formed.

A part of the other surface (an edge of the back surface) in addition to the corner portion 71 is also covered by the continuous film 13, whereby an anchor effect is generated. As a result, the film 13 is difficult to come off outward in a direction perpendicular to the touch surface 29. The film 13 extends to the other surface, such that a peeling point when the film 13 is peeled off can be further moved toward an inner side direction from an outer shape of the touch surface 29, which is difficult to be visually recognized by the user.

As a result, in order to improve the designability, in the film wrapping display 11 that expose the corners and the corner portions 71 of the touch panel 15 to the front surface, it is possible to more effectively prevent broken pieces of the broken touch surface 29 from scattering, or prevent a component from falling, or prevent a sharp edge of the glass from adhering to the user.

Comparative Example

Figure 6:
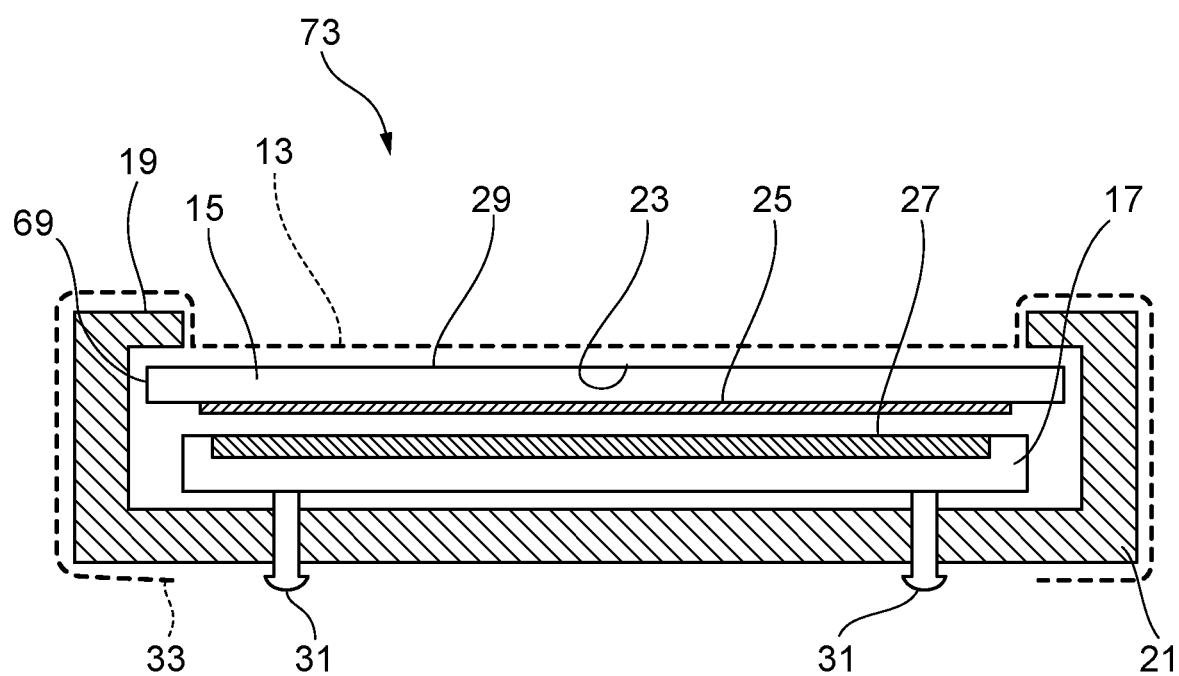
FIG. 6 is a cross-sectional view of a display according to a comparative example in which a side surface of a housing forms a bezel.
Figure 7:
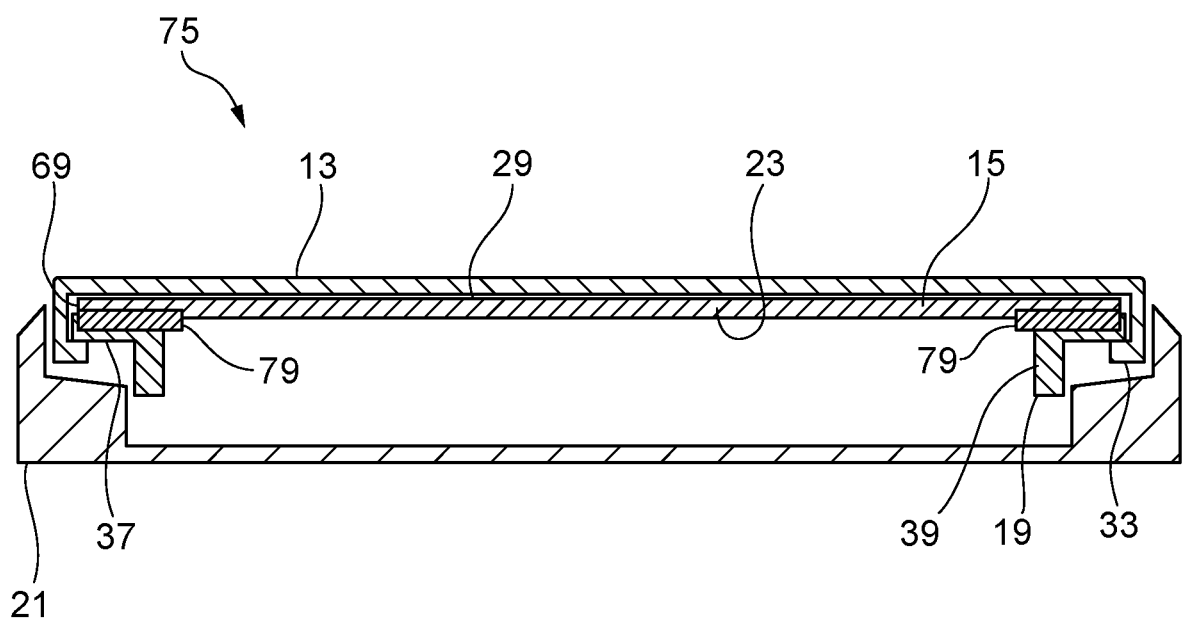
FIG. 7 is a cross-sectional view of a display according to a comparative example of a design having a flat front surface.

FIG. 6 is a cross-sectional view of a display 73 according to a comparative example in which the side surface of the housing 21 forms the bezel 19. FIG. 7 is a cross-sectional view of a display 75 according to a comparative example of a design having a flat front surface. In the display 73 illustrated in FIG. 6, the side surface of the housing 21 covers the touch surface 29 of the touch panel 15 to form the bezel 19. However, in recent years, the design having the flat front surface, which is represented by a tablet terminal, has become mainstream, such that the display 75 having the flat design as illustrated in FIG. 7 tends to become mainstream. In the display 75, the touch panel 15 is wrapped by the film 13, thereby preventing scattering of glass from the end surface 69 when an impact load is applied.

Figure 8:
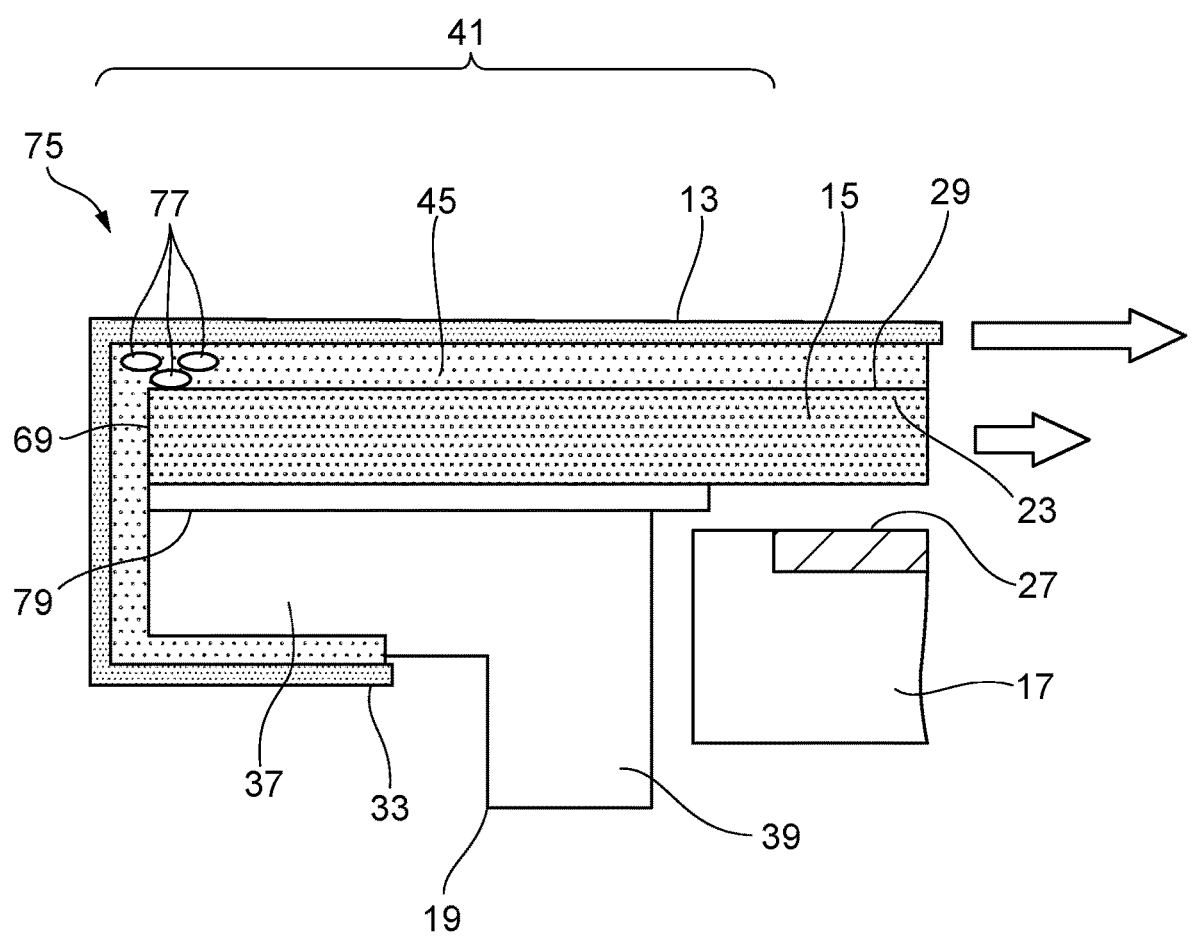
FIG. 8 is an enlarged cross-sectional view of a main part of the display illustrating a shear load acting on an adhesive layer of the film.

FIG. 8 is an enlarged cross-sectional view of a main part of the display 75 illustrating a shear load acting on the adhesive layer 45 of the film 13. Meanwhile, in the film 13 wrapped around the touch panel 15 for the purpose of preventing the scattering of glass, the edge portion 41 around a periphery of the display becomes white after molding, which may cause appearance damage. More specifically, after the film 13 is heated and attached to the film wrapping display 11, the shear load is applied to the adhesive layer 45 provided between the film 13 and the film wrapping display 11 due to a heat shrinkage difference between materials during cooling, and a fine bubble (a void 77) is generated. The formation of the fine bubble causes the appearance damage. The void 77 existing in the transparent adhesive layer 45 diverges and converges luminous flux at a boundary surface with the adhesive layer 45, and particularly, when brightness of a printing portion 79 or the like in the support portion 37 of the bezel 19 is low (for example, when the color is close to black), presence of the void 77 is emphasized and easy to be seen.

In the film wrapping display 11 according to the first embodiment, the decorative layer 43 is provided on the edge portion 41 with respect to the display 75 according to the comparative example described above, such that the adhesive layer 45 is difficult to be seen. That is, in the film wrapping display 11 according to the first embodiment, even though cloudiness is generated at the edge portion 41 in a wrapping process, the decorative layer 43 covers the adhesive layer 45, such that the void 77 becomes a portion which is difficult to be seen by the user.

Next, various modifications of the first embodiment will be described with reference to the drawings.

Figure 9:
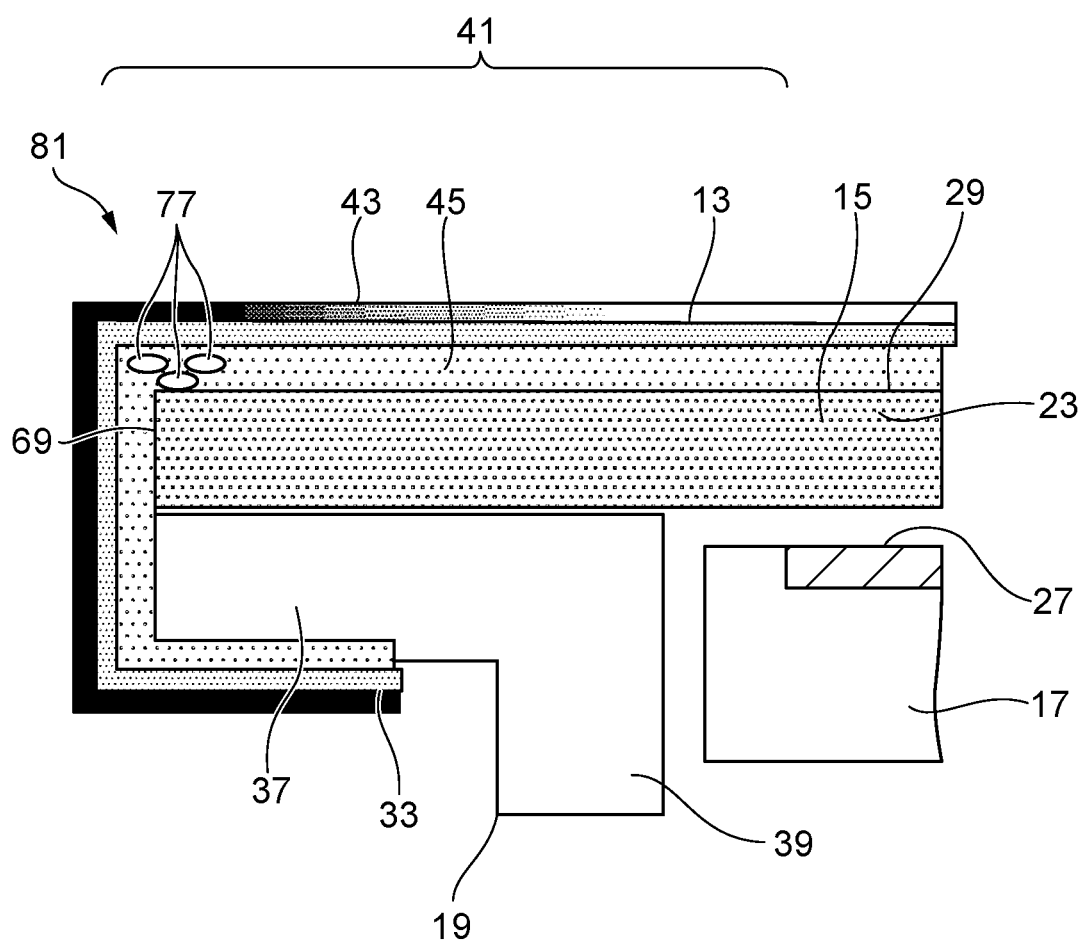
FIG. 9 is an enlarged cross-sectional view of a main part of a film wrapping display according to a first modification, in which a decorative layer is provided on an outside of the film.

FIG. 9 is an enlarged cross-sectional view of a main part of a film wrapping display according to a first modification, in which the decorative layer 43 is provided on an outside of the film 13. In a display 81 according to the first modification, the decorative layer 43 is added to the outside of the film 13 by printing or the like. The decorative layer 43 changes so that the brightness thereof gradually decreases as the distance between the decorative layer 43 and the display area 27 increases. In the decorative layer 43, the color thereof gets closer to black toward the end of the edge portion 41, such that the back surface of the film 13, that is, the void 77 of the adhesive layer 45 is difficult to be seen from the side where the user viewing the information is present.

Figure 10:
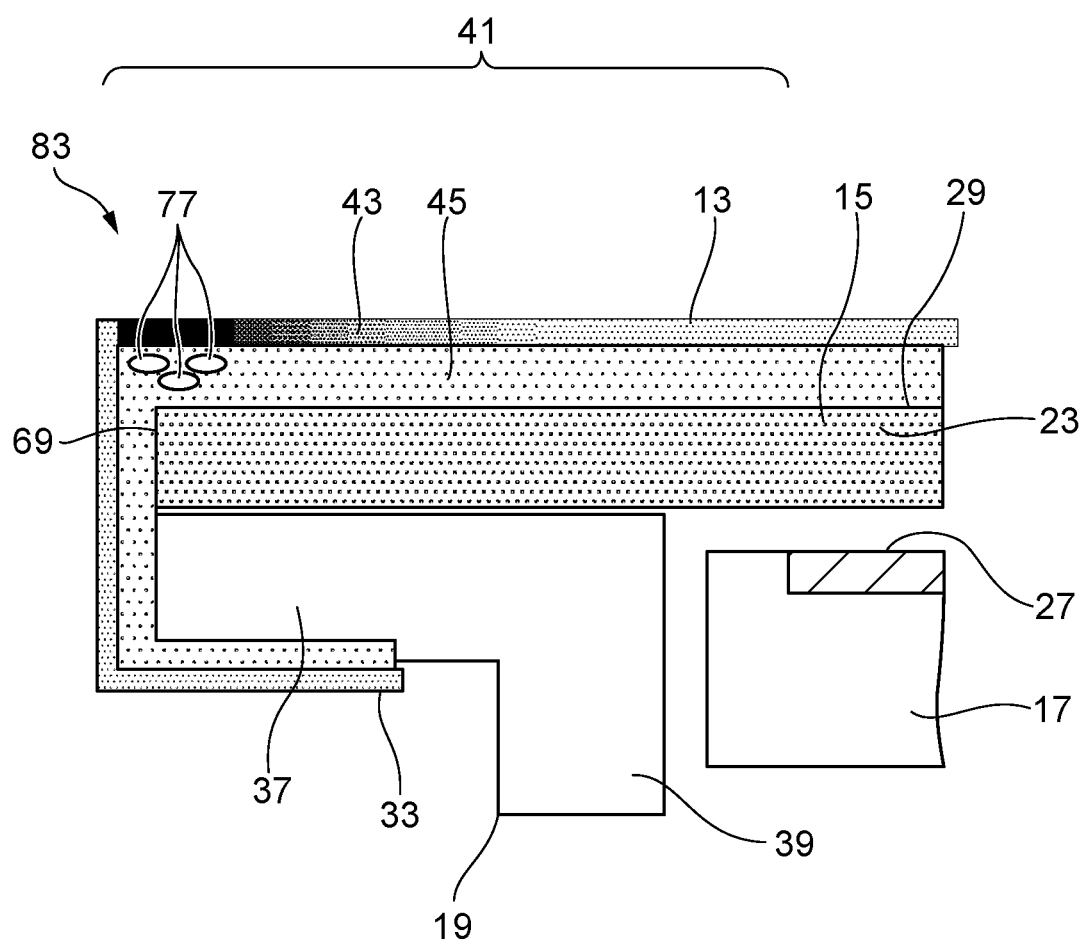
FIG. 10 is an enlarged cross-sectional view of a main part of a film wrapping display according to a second modification, in which the decorative layer is provided in a film base material.

FIG. 10 is an enlarged cross-sectional view of a main part of a film wrapping display according to a second modification, in which the decorative layer 43 is provided in a film base material. In a display 83 according to the second modification, the decorative layer 43 is added to or incorporated into the film base material. The decorative layer 43 changes so that the brightness thereof gradually decreases as the distance between the decorative layer 43 and the display area 27 increases. In the decorative layer 43, the color thereof gets closer to black toward the end of the edge portion 41, such that the back surface of the film 13, that is, the void 77 of the adhesive layer 45 is difficult to be seen from the side where the user viewing the information is present.

Figure 11:
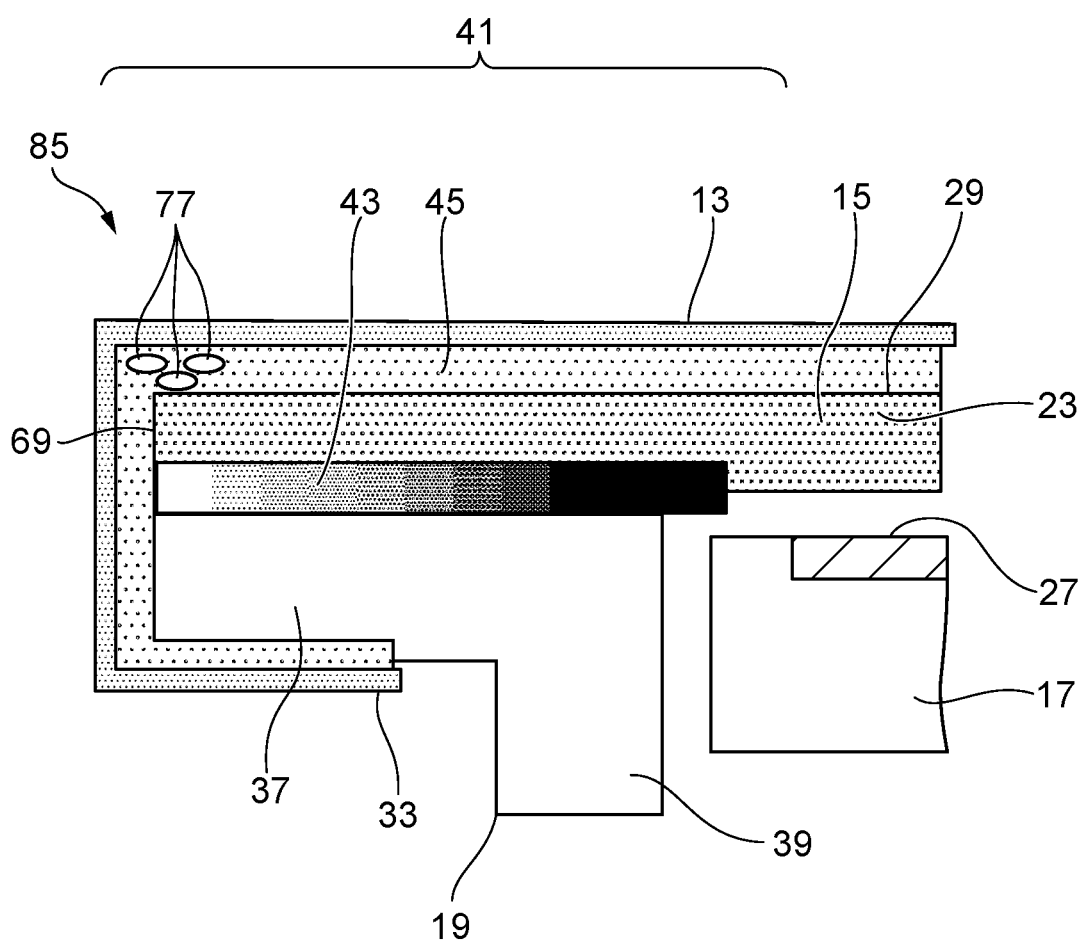
FIG. 11 is an enlarged cross-sectional view of a main part of a film wrapping display according to a third modification, in which the decorative layer is added to a back surface of the touch panel and is a printing to which a gradation that becomes white as the decorative layer goes to an outside of an edge portion is applied.

FIG. 11 is an enlarged cross-sectional view of a main part of a film wrapping display according to a third modification, in which the decorative layer 43 is added to the back surface of the touch panel 15 and is a printing to which a gradation that becomes white as the decorative layer 43 goes to an outside of the edge portion 41 is applied. In a display 85 according to the third modification, the decorative layer 43 is added to the back surface of the touch panel 15. The decorative layer 43 is, for example, a printing to which a gradation that becomes white as the distance between the decorative layer 43 and the display area 27 increases is applied. In the decorative layer 43, the color thereof gets closer to white toward the end of the edge portion 41, such that the back surface of the film 13, that is, the adhesive layer 45 looks white from the side where the user viewing the information is present. Therefore, a substance which is close to white and exists between the decorative layer 43 and the user (for example, the void 77) is difficult to be visually recognized.

Figure 12:
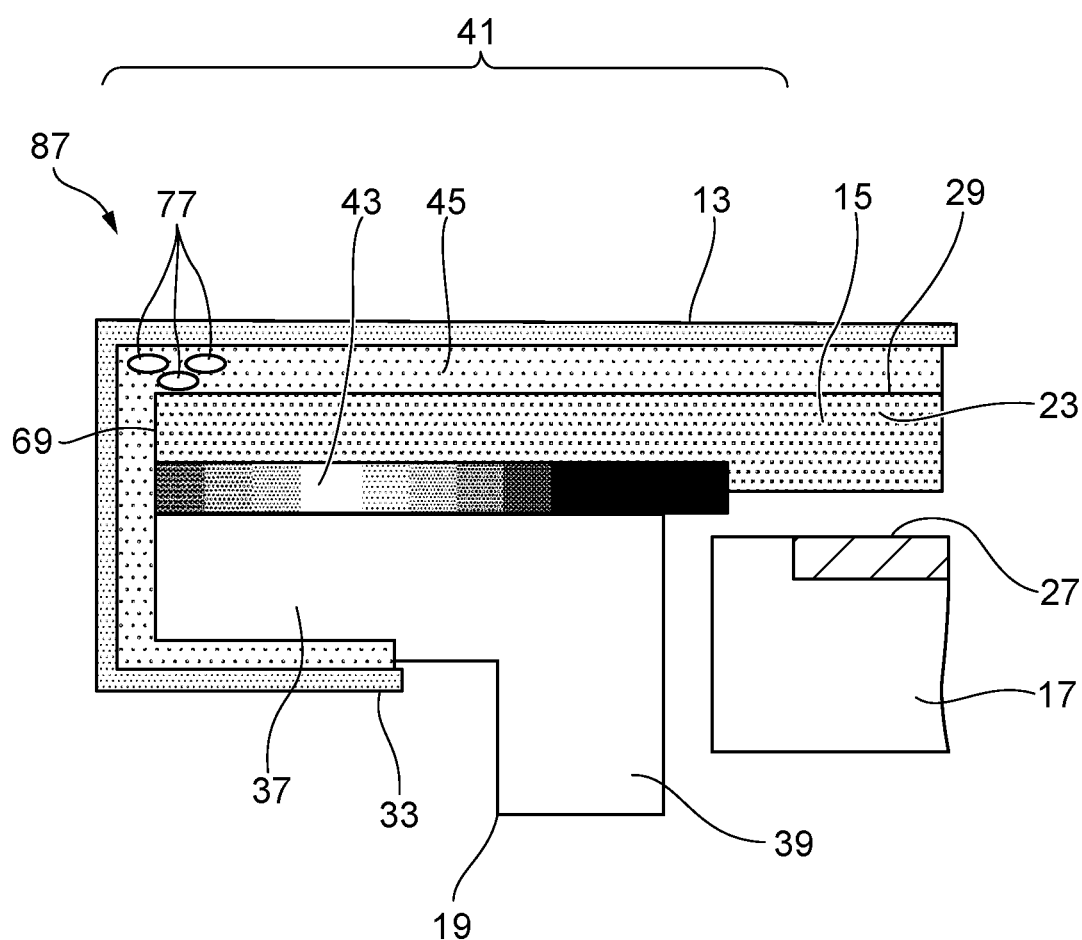
FIG. 12 is an enlarged cross-sectional view of a main part of a film wrapping display according to a fourth modification, in which the decorative layer is a printing of a camouflage pattern of white and any color added to the back surface of the touch panel.

FIG. 12 is an enlarged cross-sectional view of a main part of a film wrapping display according to a fourth modification, in which the decorative layer 43 is a printing of a camouflage pattern of white and any color added to the back surface of the touch panel 15. In a display 87 according to the fourth modification, the decorative layer 43 is added to the back surface of the touch panel 15. The decorative layer 43 is the printing of the camouflage pattern of white and any color. Camouflage is formed by irregularly adding several colors such as black, white, blue, or the like. The camouflage pattern is visually recognized by the user through the film 13, the adhesive layer 45, and the touch panel 15. Therefore, a substance existing between the camouflage pattern and the user (for example, the void 77) is difficult to be visually recognized.

Figure 13:
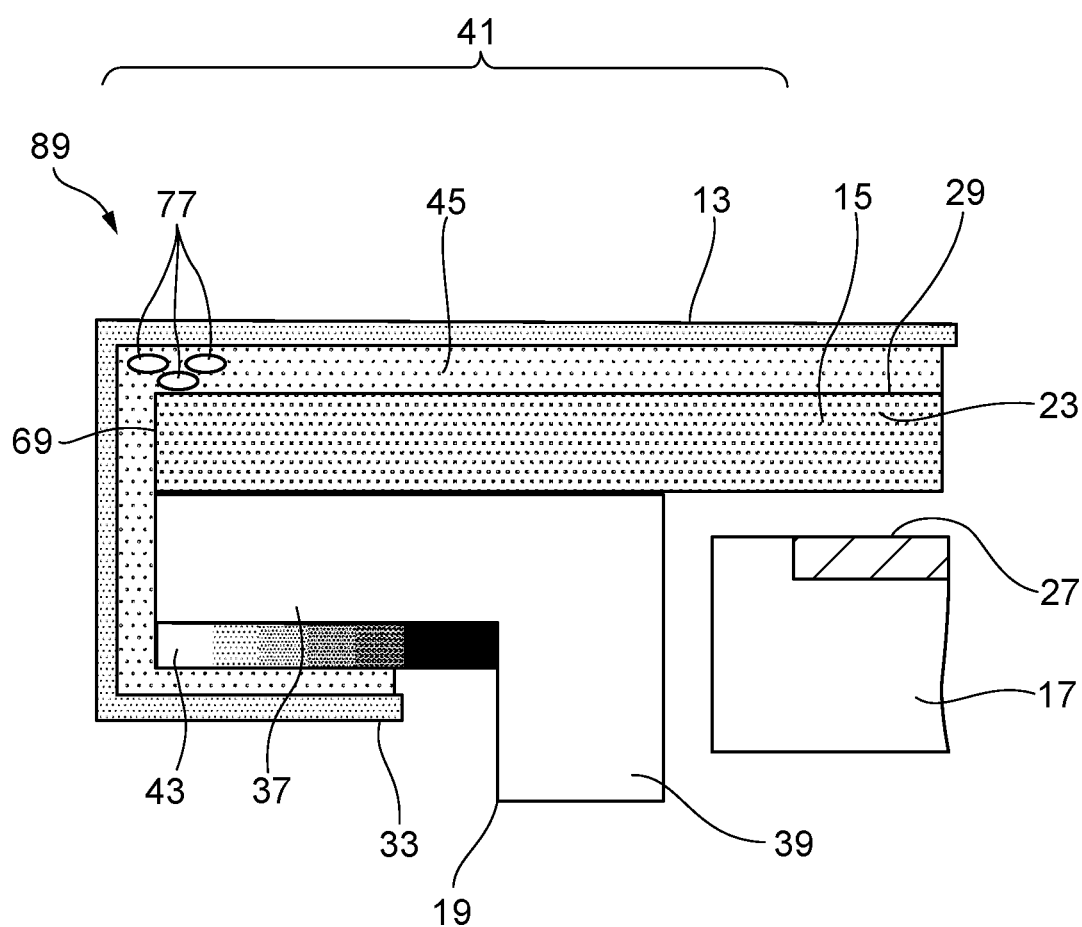
FIG. 13 is an enlarged cross-sectional view of a main part of a film wrapping display according to a fifth modification, in which the decorative layer is added to a back surface of a support portion and is a printing to which a gradation that becomes white as the decorative layer goes to the outside of the edge portion is applied.

FIG. 13 is an enlarged cross-sectional view of a main part of a film wrapping display according to a fifth modification, in which the support portion 37 itself also serves as a decorative layer, and the support portion 37 is colored with a gradation that becomes white toward the outside of the edge portion 41. In a display 89 according to the fifth modification, the support portion 37 also serves as the decorative layer by coloring the back surface of the transparent support portion 37. In the support portion 37, the color thereof gets closer to white toward the end of the edge portion 41, such that the back surface of the film 13, that is, the adhesive layer 45 looks white from the side where the user viewing the information is present. Therefore, a substance which is close to white and exists between the decorative layer 43 and the user (for example, the void 77) is difficult to be visually recognized. In the display 89 according to the fifth modification, the support portion 37 also serves as the decorative layer by coloring the back surface of the transparent support portion 37, and a coloring method is not limited thereto. For example, the whole support portion 37 may be colored so that as the support portion 37 gets closer to the end of the edge portion 41, the color thereof gets closer to white. The coloring may be performed by printing, or may be implemented by a color of a material itself of the support portion 37.

Figure 14:
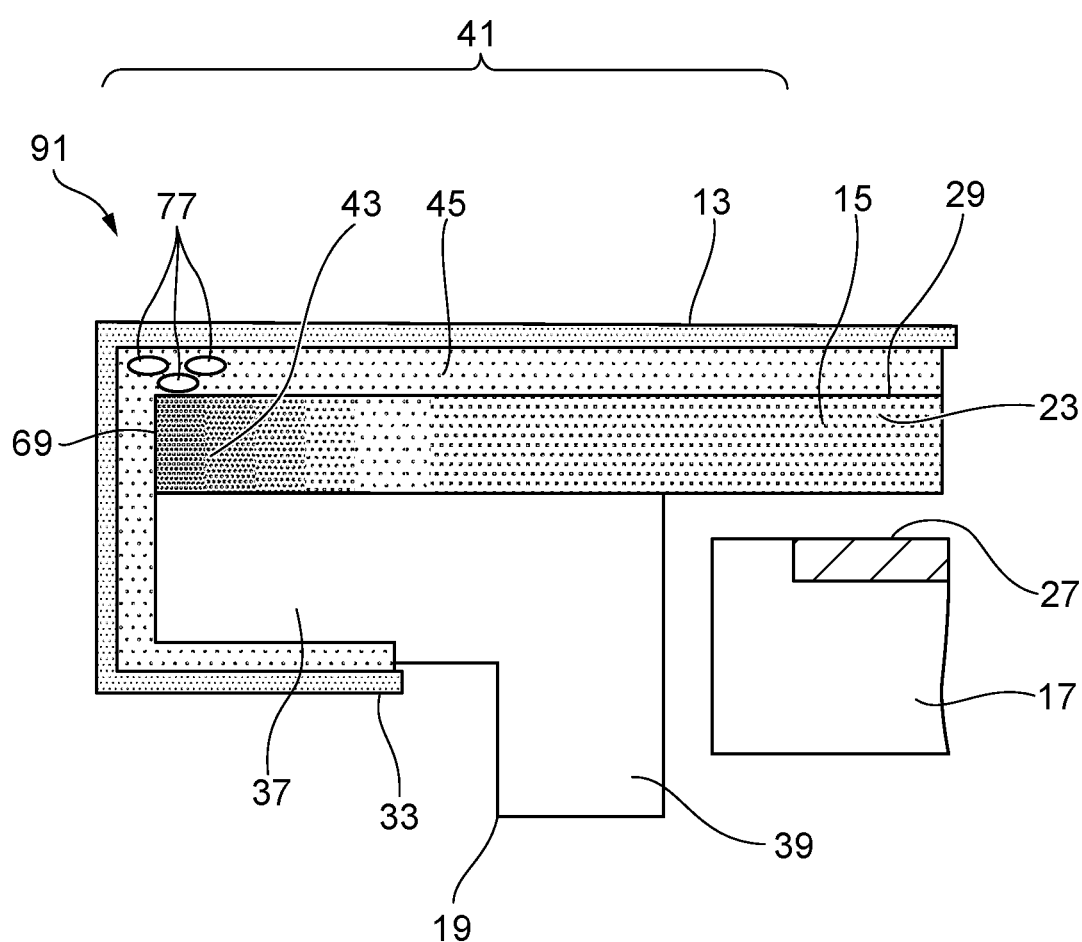
FIG. 14 is an enlarged cross-sectional view of a main part of a film wrapping display according to a sixth modification, in which the decorative layer is a printing of a camouflage pattern of white and any color added to a material of a transparent plate.

FIG. 14 is an enlarged cross-sectional view of a main part of a film wrapping display according to a sixth modification, in which the decorative layer 43 is a printing of a camouflage pattern of white and any color added to a material of a transparent plate. A display 91 according to the sixth modification is a color formed by adding the decorative layer 43 to a material of the touch panel 15. The decorative layer 43 is a printing of a camouflage pattern of any color. The decorative layer 43 is an example to which a gradation in which the camouflage pattern becomes darker toward the outside of the edge portion 41 is applied. The camouflage pattern is visually recognized by the user through the film 13 and the adhesive layer 45. Therefore, a substance existing between the camouflage pattern and the user (for example, the void 77) is difficult to be visually recognized.

Next, an operation of the film wrapping display will be described.

The film wrapping display includes: the display device 17 that displays information in the display area 27 by emitting light; the transparent plate (the touch panel 15) disposed on the display surface side of the display device 17; the bezel 19 that is disposed around the periphery of the display device 17 and includes the support portion 37 that supports the transparent plate; and the film 13 that is continuously attached to both of the transparent plate and the bezel 19. The periphery of the display area 27 in which the transparent plate is supported by the support portion 37 becomes the edge portion 41. The edge portion 41 includes the decorative layer 43 whose pattern or color is different from that of the display area 27.

In the film wrapping display 11, the edge portion 41 includes the decorative layer 43. The decorative layer 43 is provided around the periphery of the display area 27, thereby making it possible to contribute to various designs of the film wrapping display 11 without impairing the visibility of the display device 17.

The decorative layer 43 can provide functionality in addition to the design. That is, in the film wrapping display 11, the film 13 for preventing the scattering of glass from the end surface 69 when the impact load is applied is wrapped around the touch panel 15. The film 13 has a property that the voids 77 is easy to be generated in the adhesive layer 45 between the film 13 and the film wrapping display 11 due to the difference in heat shrinkage during the wrapping process. The decorative layer 43 has a function of causing the void 77 to be invisible or difficult to be seen. As a result, according to the film wrapping display 11 including the decorative layer 43, at the edge portion 41 where the void 77 is most likely to be generated, the void 77 can be difficult to be seen (difficult to transmit light) or a substance can be difficult to be seen (difficult to be identified). In the specification, identification indicates that the user can distinguish between two visual stimuli that are qualitatively or quantitatively different. As a result, the film wrapping display 11 can improve the design and the appearance quality at once.

In the film wrapping display, the color of the decorative layer 43 has higher brightness, lower saturation, higher reflectance, or lower transparency than those of the display area 27.

In the film wrapping display 11, the decorative layer 43 has higher brightness, lower saturation, higher reflectance, or lower transparency than those of the display area 27. Here, for example, the decorative layer 43 can be appropriately provided on the side opposite to the side where the user is present with the adhesive layer 45 sandwiched therebetween (for example, provided between the adhesive layer 45 and the support portion 37). When the decorative layer 43 is provided between the adhesive layer 45 and the support portion 37, for example, the decorative layer 43 having high brightness causes the void 77 of the adhesive layer 45 to be difficult to be identified. The decorative layer 43 having low saturation causes the void 77 of the adhesive layer 45 to be difficult to be identified. The decorative layer 43 having high reflectance causes the void 77 of the adhesive layer 45 to be difficult to be seen. The decorative layer 43 having low transparency causes the void 77 of the adhesive layer 45 to be difficult to be seen.

In the film wrapping display, the brightness, the saturation, the reflectance, or the transparency of the decorative layer 43 gradually change as the distance between the decorative layer 43 and the display area 27 increases.

In the film wrapping display 11, the brightness, the saturation, the reflectance, or the transparency of the decorative layer 43 gradually change as the distance between the decorative layer 43 and the display area 27 increases. According to the decorative layer 43, it is easy to improve the design in comparison with a monotonous pattern. In patterns such as the camouflage pattern or the like, the void 77 can be more difficult to be identified by applying the gradation to the brightness.

In the film wrapping display, the transparency of the decorative layer 43 gradually decreases as the distance between the decorative layer 43 and the display area 27 increases.

In the film wrapping display 11, the transparency of the decorative layer 43 gradually decreases as the distance between the decorative layer 43 and the display area 27 increases. Here, for example, the decorative layer 43 can be provided on the side where the user is present with the adhesive layer 45 sandwiched therebetween (for example, between the film 13 and the adhesive layer 45). When the decorative layer 43 is provided between the film 13 and the adhesive layer 45, the void 77 can be more difficult to be identified by application of the gradation in which the transparency of the decorative layer 43 decreases as the distance between the decorative layer 43 and the display area 27 increases.

In the film wrapping display, the decorative layer 43 is added to the outside or inside of the film 13 or to the film base material.

In the film wrapping display 11, the decorative layer 43 is added to the outside or inside of the film 13 or to the film base material. That is, the decorative layer 43 here is provided on the side where the user is present with the adhesive layer 45 sandwiched therebetween. By providing the decorative layer 43 on the user side rather than the adhesive layer 45, the decorative layer 43 is illuminated with external light and the light that reaches the user is prevented, such that the void 77 can be difficult to be seen (the light is difficult to be reached), or the substance is difficult to be identified.

In the film wrapping display, the decorative layer 43 is the printing added to at least one of the front and back surfaces of the transparent plate.

In the film wrapping display 11, the decorative layer 43 is added to at least one of the front and back surfaces of the transparent plate. That is, the decorative layer 43 is provided on the side opposite to the side where the user is present with the adhesive layer 45 sandwiched therebetween. Therefore, the user sees the decorative layer 43 illuminated by external light transmitted through the film 13 and the touch panel 15. After passing through the film 13, the adhesive layer 45, and the touch panel 15, the external light at this time irradiates the decorative layer 43, and the irradiated decorative layer 43 is visually recognized by the user via a reverse route thereof. That is, the user sees the decorative layer 43 through the void. The decorative layer 43 can make it difficult to identify the substance by adding a pattern (for example, the camouflage pattern) or a color similar to the void 77.

In the film wrapping display, the decorative layer 43 is a color added to a material of the transparent plate.

In the film wrapping display 11, the decorative layer 43 becomes a color added to the material of the touch panel 15. Then, the decorative layer 43 is provided on the side opposite to the side where the user is present with the adhesive layer 45 sandwiched therebetween. Therefore, the user sees the decorative layer 43 illuminated by external light. After passing through the film 13, the adhesive layer 45, and the touch panel 15, the external light irradiates the decorative layer 43, and the irradiated decorative layer 43 is visually recognized by the user via a reverse route thereof. That is, the user sees the decorative layer 43 through the void. The decorative layer 43 can make it difficult to identify the substance by adding a pattern (for example, the camouflage pattern) or a color similar to the void 77. Since the decorative layer 43 is added to the base material of the touch panel 15, a printing process can be omitted such that manufacturing can be easily performed.

In the film wrapping display, the transparent plate is the protective glass of the display device 17.

In the film wrapping display 11, the protective glass is the cover glass 23. By providing the cover glass 23 on the touch panel 15, the film wrapping display 11 protects the sensor glass 25 and improves the durability of the touch panel 15, thereby making it possible to improve the design of the appearance (flattening the front surface).

Therefore, according to the film wrapping display 11 of the first embodiment, it is possible to improve the aesthetic appearance of the edge portion 41 and eliminate unnaturalness in appearance.

While various embodiments are described above with reference to the drawings, it goes without saying that the present disclosure is not limited to such embodiments. It is obvious that those skilled in the art can come up with various examples of modifications, corrections, substitutions, additions, deletions, and equivalents within the scope of claims, and it should be naturally understood that various examples thereof also belong to the technical scope of the present disclosure. Respective components in various embodiments described above may be freely and selectively combined in the range without deviating from the spirit of the invention.

What is claimed is:

1. A film wrapping display, comprising:
 a display device configured to display information in a display area by emitting light;
 a transparent plate disposed on a display surface side of the display device;

a bezel disposed around a periphery of the display device and including a support portion that supports the transparent plate; and a film continuously attached to both of the transparent plate and the bezel, wherein corners of the transparent plate, all circumferences including edges of the corners, a side surface of the support portion, and a part of a back surface of the support portion are wrapped with the film without providing a gap, a periphery of the display area where the transparent plate is supported by the support portion is an edge portion, the edge portion includes a printed layer whose pattern or color is different from that of the display area, the printed layer is located on a back surface of the transparent plate, and the printed layer has a graduation that lightens to white in a direction extending towards an outer edge of the edge portion.

2. The film wrapping display according to claim 1, wherein
the color of the printed layer has at least one of higher brightness and higher reflectance than that of the display area.

3. The film wrapping display according to claim 1, wherein
brightness, saturation, reflectance, or transparency of the printed layer gradually changes as a distance between the printed layer and the display area increases.

4. The film wrapping display according to claim 1, wherein
the printed layer is a color added to a material of the transparent plate.

5. The film wrapping display according to claim 1, wherein
the transparent plate is a protective glass for the display device.

6. The film wrapping display according to claim 1, wherein
the back surface of the support portion faces in a direction opposite to a direction in which the display device displays the information in the display area by emitting the light.

7. The film wrapping display according to claim 1, wherein the film is continuously attached to both of the transparent plate and the bezel by three dimension overlay method (TOM) molding.

* * * * *